United States Patent
Lee et al.

(10) Patent No.: US 9,798,056 B2
(45) Date of Patent: Oct. 24, 2017

(54) PRESSURE-SENSITIVE ADHESIVE COMPOSITION

(71) Applicant: LG CHEM, LTD., Seoul (KR)

(72) Inventors: Min Ki Lee, Daejeon (KR); No Ma Hoon Kim, Daejeon (KR); Sung Soo Yoon, Daejeon (KR); Su Jeong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/271,193

(22) Filed: May 6, 2014

(65) Prior Publication Data

US 2014/0242303 A1    Aug. 28, 2014

Related U.S. Application Data

(63) Continuation of application No. PCT/KR2013/004831, filed on May 31, 2013.

(30) Foreign Application Priority Data

May 31, 2012  (KR) ................. 10-2012-0058824
May 31, 2013  (KR) ................. 10-2013-0062247

(51) Int. Cl.
   G02B 5/30      (2006.01)
   C09J 153/00    (2006.01)
   C08G 18/62     (2006.01)
   C09J 175/04    (2006.01)
   C08F 293/00    (2006.01)
   C09J 7/02      (2006.01)
   G02F 1/1335    (2006.01)

(52) U.S. Cl.
   CPC ........ *G02B 5/3025* (2013.01); *C08F 293/005* (2013.01); *C08G 18/6229* (2013.01); *C09J 7/0246* (2013.01); *C09J 153/00* (2013.01); *C09J 175/04* (2013.01); *B32B 2457/202* (2013.01); *C08F 2438/01* (2013.01); *C08G 2170/40* (2013.01); *C09J 2203/318* (2013.01); *C09J 2453/00* (2013.01); *G02B 5/3033* (2013.01); *G02F 1/133528* (2013.01); *G02F 2202/28* (2013.01); *Y10T 428/1082* (2015.01); *Y10T 428/2891* (2015.01)

(58) Field of Classification Search
   None
   See application file for complete search history.

(56) References Cited

U.S. PATENT DOCUMENTS

| | | | |
|---|---|---|---|
| 6,448,337 B1 * | 9/2002 | Gaddam ................. | C09J 201/02 525/193 |
| 7,385,007 B2 * | 6/2008 | Moroishi et al. ............. | 525/192 |
| 7,833,622 B2 * | 11/2010 | Hsu et al. ...................... | 428/327 |
| 9,175,197 B2 | 11/2015 | Kanemura et al. | |
| 2006/0024521 A1 | 2/2006 | Everaerts et al. | |
| 2006/0210929 A1 * | 9/2006 | Yamada ................. | G03F 7/0382 430/311 |
| 2007/0055006 A1 | 3/2007 | Kim et al. | |
| 2008/0311352 A1 | 12/2008 | Hsu et al. | |
| 2011/0043737 A1 * | 2/2011 | Kim et al. .................... | 349/122 |
| 2011/0244218 A1 * | 10/2011 | Suzuki et al. ................ | 428/323 |

FOREIGN PATENT DOCUMENTS

| | | | | |
|---|---|---|---|---|
| CN | 1764679 A | 4/2006 | | |
| CN | 101080657 A | 11/2007 | | |
| CN | 101998982 A | 3/2011 | | |
| CN | 102099432 A | 6/2011 | | |
| EP | 1 865 003 A1 | 12/2007 | | |
| EP | 2 578 655 A1 | 4/2013 | | |
| JP | 07-082542 | * 3/1995 | ............ | C09J 151/08 |
| JP | 200280687 A | 3/2002 | | |
| JP | 2004002782 | 1/2004 | | |
| JP | 2006282687 | 10/2006 | | |
| JP | 2007332276 A | 12/2007 | | |
| JP | 2008291071 A | 12/2008 | | |
| JP | 201018796 A | 1/2010 | | |
| KR | 1020050076706 | 7/2005 | | |
| TW | 200628579 | 8/2006 | | |
| TW | 200948918 A | 12/2009 | | |
| WO | 9929795 | 6/1999 | | |
| WO | 2006/059780 A1 | 6/2006 | | |
| WO | 2009111433 A1 | 9/2009 | | |
| WO | 2009126532 | 10/2009 | | |
| WO | 2011/152514 A1 | 12/2011 | | |

* cited by examiner

*Primary Examiner* — Anthony J Frost
(74) *Attorney, Agent, or Firm* — Dentons US LLP

(57) ABSTRACT

The present application is relates to a pressure-sensitive adhesive composition. The pressure-sensitive adhesive composition of the present application may form a pressure-sensitive adhesive having excellent durability and reliability, stress relaxation and reworkability. In addition, when the pressure-sensitive adhesive composition is used collaterally, for example, a coating process may be efficiently performed even when a coating solid content is high, thereby maintaining excellent productivity and forming a pressure-sensitive adhesive having excellent uniformity in thickness. The pressure-sensitive adhesive composition may be used for an optical film such as a polarizing plate.

12 Claims, No Drawings

PRESSURE-SENSITIVE ADHESIVE COMPOSITION

This application is a Continuation Bypass Application of International Patent Application No. PCT/KR2013/004831, filed May 31,2013 and claims the benefit of Korean Application No. 10-2012-0058824, filed May 31, 2012 and Korean Application No. 10-2013-0062247, filed on May 31, 2013, all of which are hereby incorporated herein by reference in their entirety for all purposes as if fully set forth herein.

TECHNICAL FIELD

The present application relates to a pressure-sensitive adhesive composition, an optical laminate, a polarizing plate and a display device.

BACKGROUND ART

A liquid crystal display device (hereinafter, referred to as an "LCD device") usually includes a liquid crystal panel including a liquid crystal component injected between two transparent substrates, and an optical film. As an optical film, a polarizing film, a retardation film or a brightness-enhancing film may be used, and to laminate such an optical film or attach the optical film to an adherent such as the liquid crystal panel, a pressure-sensitive adhesive for an optical film is widely used. As a pressure-sensitive adhesive, an acrylic polymer, a rubber, a urethane resin, a silicon resin or an ethylene vinyl acetate(EVA) resin may be used, and particularly, as a pressure-sensitive adhesive for an optical film such as a polarizing plate, an acrylic copolymer having excellent transparency and high resistance to oxidation or yellowing is generally used.

Main physical properties required for a pressure-sensitive adhesive composition for an optical film include cohesive strength, pressure-sensitive adhesive strength, reworkability, low light leakage and stress relaxation. In Patent documents 1 to 3, a pressure-sensitive adhesive composition for achieving the above physical properties is suggested.

PATENT DOCUMENT

Patent document 1: Korean Patent document NO.1023839
Patent document 2: Korean Patent document NO.1171976
Patent document 3: Korean Patent document NO.1171977

DISCLOSURE

Technical Problem

The present application is directed to providing a pressure-sensitive adhesive composition, an optical laminate, a polarizing plate and a display device.

Technical Solution

One aspect of a pressure-sensitive adhesive composition may be including a block copolymer. The term "block copolymer" used herein may refer to a copolymer including blocks of different polymerized monomers.

In one embodiment, the block copolymer may include a first block having a glass transition temperature of 50° C. or more and a second block having a glass transition temperature of −10° C. or less. The term "glass transition temperature of a predetermined block" of the block copolymer used herein may refer to a glass transition temperature measured from a polymer only formed of monomers included in the block. In one embodiment, the glass transition temperature of the first block may be 60° C. or more, 65° C. or more, 70° C. or more, or 75° C. or more. In addition, the upper limit of the glass transition temperature of the first block may be, but is not particularly limited to, for example, approximately 150° C., 140° C., 130° C. or 120° C. In addition, the glass transition temperature of the second block may be 20° C. or less, −30° C. or less, −35° C. or less, or −40° C. or less. In addition, the lower limit of the glass transition temperature of the second block may be, but is not particularly limited to, approximately −80° C., −70° C., −60° C. or −55° C. The block copolymer including at least two kinds of the above-described blocks may form, for example, a micro phase separated structure in a pressure-sensitive adhesive. Such a block copolymer may form a pressure-sensitive adhesive having suitable cohesive strength according to a temperature change, thereby maintaining excellent physical properties required for an optical film such as durability and reliability, prevention of light leakage and reworkability.

In the block copolymer, the first block may have, for example, a number average molecular weight($M_n$) of 2,500 to 150,000. The number average molecular weight of the first block may refer to, for example, a number average molecular weight of a polymer prepared by polymerizing only monomers forming the first block. The number average molecular weight disclosed herein may be measured by a method to be disclosed in Example, for example, using gel permeation chromatography(GPC). In another embodiment, the number average molecular weight of the first block may be 5,000 to 100,000 or 10,000 to 50,000. In addition, the block copolymer may have a number average molecular weight of 50,000 to 300,000. In another embodiment, the number average molecular weight of the block copolymer may be 90,000 to 250,000, 90,000 to 200,000 or 90,000 to 180,000. In addition, the block copolymer may have a polydispersity index(PDI; $M_w/M_n$), that is, a ratio($M_w/M_n$) of a weight-average molecular weight ($M_w$) to a number average molecular weight($M_n$) ranging from 1.0 to 2.5 or 1.4 to 2.5. By controlling the molecular weight characteristic as described above, a pressure-sensitive adhesive composition or pressure-sensitive adhesive having excellent physical properties may be provided.

In one embodiment, the block copolymer may be a crosslinkable copolymer having a crosslinkable functional group. The crosslinkable functional group may be a hydroxyl group, a carboxyl group, an isocyanate group or a glycidyl group, and preferably, a hydroxyl group.

The crosslinkable functional group may be included in, for example, the second block having a low glass transition temperature. In one embodiment, the crosslinkable functional group may not be included in the first block having a high glass transition temperature, but in the second block. When the crosslinkable functional group is included in the second block, the pressure-sensitive adhesive may have suitable cohesive strength and stress relaxation according to a temperature change, thereby maintaining excellent physical properties required for an optical film such as durability and reliability, prevention of light leakage and reworkability.

In the block copolymer, kinds of monomers forming the first block and the second block are not particularly limited as long as the above range of glass transition temperature is ensured by combination of the monomers.

In one embodiment, the first block may include a polymerized unit derived from a (meth)acrylic acid ester monomer. The description "monomer is included in a polymer or block in a polymerized unit" used herein may mean that the monomer forms a backbone, for example, a main or side chain, of a polymer or block through polymerization. As the (meth)acrylic acid ester monomer, for example, an alkyl (meth)acrylate may be used. In one embodiment, in consideration of control of cohesive strength, glass transition temperature and pressure-sensitive adhesion, an alkyl (meth)acrylate having an alkyl group having 1 to 20, 1 to 16, 1 to 12, 1 to 8 or 1 to 4 carbon atoms may be used. As an example of the monomer described above, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate or lauryl (meth)acrylate may be used, and at least one or at least two thereof may be selected to ensure the glass transition temperature. In consideration of easy control of the glass transition temperature, as the monomer forming the first block, a methacrylic acid ester monomer of the above-described monomers, for example, an alkyl methacrylate having an alkyl group having 1 to 20, 1 to 16, 1 to 12, 1 to 8 or 1 to 4 carbon atoms may be used, but the present invention is not particularly limited thereto.

The second block of the block copolymer may include, for example, a polymerized unit derived from 90 to 99.9 parts by weight of a (meth)acrylic acid ester monomer and 0.1 to 10 parts by weight of a copolymerizable monomer having a crosslinkable functional group. The unit "parts by weight" used herein may refer to a weight ratio of components. For example, as described above, the sentence "the second block includes a polymerized unit derived from 90 to 99.9 parts by weight of a (meth)acrylic acid ester monomer and 0.1 to 10 parts by weight of a copolymerizable monomer having a crosslinkable functional group" may mean that a weight ratio(A:B) of the (meth)acrylic acid ester monomer(A) to the copolymerizable monomer(B) having a crosslinkable functional group, which forms the polymerized unit of the second block, is 90 to 99.9:0.1 to 10.

As the (meth)acrylic acid ester monomer forming the second block, a kind of monomer, which may finally ensure the above-described range of the glass transition temperature through copolymerization with the copolymerizable monomer, among the monomers capable of being included in the first block may be used. In consideration of easy control of the glass transition temperature, as the (meth)acrylic acid ester monomer forming the second block, an acrylic acid ester monomer, for example, an alkyl acrylate having an alkyl group having 1 to 20, 1 to 16, 1 to 12, 1 to 8 or 1 to 4 carbon atoms among the above-described monomers may be used, but the present invention is not particularly limited thereto.

As the copolymerizable monomer having a crosslinkable functional group, for example, like the (meth)acrylic acid ester monomer, a monomer having a part capable of being copolymerized with another monomer included in the block copolymer and having the above-described crosslinkable functional group, for example, a hydroxyl group, may be used. In the field of preparing a pressure-sensitive adhesive, various copolymerizable monomers having the above-described crosslinkable functional group are known, and all of such monomers may be used in the polymer. For example, as the copolymerizable monomer having a hydroxyl group, a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, or a hydroxyalkyleneglycol (meth)acrylate such as 2-hydroxyethyleneglycol (meth)acrylate or 2-hydroxypropyleneglycol (meth)acrylate may be used, but the present invention is not limited thereto. In consideration of reactivity with another monomer forming the second block, or easy control of the glass transition temperature, a hydroxyalkyl acrylate or hydroxyalkyleneglycol acrylate of the above-described monomers may be used, but the present invention is not limited thereto.

The first block and/or the second block may further include an arbitrary comonomer when needed to control a glass transition temperature, and the monomer may be included as a polymerization unit. The comonomer may be, but is not limited to, a nitrogen-containing monomer such as (meth)acrylonitrile, (meth)acrylamide, N-methyl (meth)acrylamide, N-butoxy methyl (meth)acrylamide, N-vinyl pyrrolidone or N-vinyl caprolactame; an alkyleneoxide group-containing monomer such as alkoxy alkyleneglycol (meth)acrylic acid ester, alkoxy dialkyleneglycol (meth)acrylic acid ester, alkoxy trialkyleneglycol (meth)acrylic acid ester, alkoxy tetraalkyleneglycol (meth)acrylic acid ester, alkoxy polyethyleneglycol (meth)acrylic acid ester, phenoxy alkyleneglycol (meth)acrylic acid ester, phenoxy dialkyleneglycol (meth)acrylic acid ester, phenoxy trialkyleneglycol (meth)acrylic acid ester, phenoxy tetraalkyleneglycol (meth)acrylic acid ester or phenoxy polyalkyleneglycol (meth)acrylic acid ester; a styrene-based monomer such as styrene or methyl styrene; a glycidyl group-containing monomer such as glycidyl (meth)acrylate; or a carboxylic acid vinyl ester such as vinyl acetate. Suitable one or at least two selected from the above comonomers may be included in a polymer as needed. Such comonomers may be included in the block copolymer, for example, at 20 parts by weight or less, or 0.1 to 15 parts by weight, relative to a weight of another monomer in each block.

The block copolymer may include, for example, 10 to 50 parts by weight of the first block and 50 to 90 parts by weight of the second block. By controlling the weight ratio between the first block and the second block as described above, a pressure-sensitive adhesive composition and a pressure-sensitive adhesive, which have excellent physical properties, may be provided. In another embodiment, the block copolymer may include 5 to 45 parts by weight of the first block and 55 to 95 parts by weight of the second block, or 5 to 45 parts by weight of the first block and 60 to 95 parts by weight of the second block.

In one embodiment, the block copolymer may be a diblock copolymer including the first and second blocks, that is, a block copolymer including only two blocks such as the first and second blocks. By using the diblock copolymer, durability and reliability, stress relaxation and reworkability of the pressure-sensitive adhesive may be excellently maintained.

A method of preparing the block copolymer is not particularly limited, and may use a conventional method. The block copolymer may be polymerized by, for example, living radical polymerization(LRP), such as a suitable one selected from anionic polymerization performed in the presence of an inorganic salt such as a salt of an alkali metal or alkali earth metal using an organic earth metal complex or organic alkali metal compound as a polymerization initiator, anionic polymerization performed in the presence of an organic aluminum compound using an organic alkali metal compound as a polymerization initiator, atom transfer radical polymerization(ATRP) using an atom transfer radical polymerizer as a polymerization controller, an activators regenerated by electron transfer(ARGET) ATRP performed in the presence of an organic or inorganic reductant generating electrons but using an atom transfer radical polymerizer as a polymerization controller, initiators for continuous activator regeneration(ICAR) ATRP, reversible addition-fragmentation chain transfer(RAFT) polymerization using an inorganic reductant reversible addition-fragmentation chain transfer agent, and a method using an organic tellurium compound as an initiator.

The pressure-sensitive adhesive composition may further include a crosslinking agent capable of crosslinking the block copolymer. The crosslinking agent may include at least two functional groups capable of reacting with a crosslinkable functional group included in the block copolymer. The crosslinking agent may be an isocyanate crosslinking agent, an epoxy crosslinking agent, an aziridine crosslinking agent or a metal chelate crosslinking agent, and preferably, an isocyanate crosslinking agent.

As the isocyanate crosslinking agent, for example, a diisocyanate compound such as tolylene diisocyanate, xylene diisocyanate, diphenylmethane diisocyanate, hexamethylene diisocyanate, isoboron diisocyanate, tetramethylxylene diisocyanate or naphthalene diisocyanate, or a compound prepared by reacting the diisocyanate compound with a polyol, may be used, and the polyol may be, for example, trimethylol propane.

In the pressure-sensitive adhesive composition, one or at least two of the crosslinking agents described above may be included, but the present invention is not limited thereto.

A multifunctional crosslinking agent may be included in the pressure-sensitive adhesive composition at 0.01 to 10 or 0.01 to 5 parts by weight, relative to 100 parts by weight of the block copolymer, and in this range, gel fraction, cohesive strength, pressure-sensitive adhesive strength and durability of the pressure-sensitive adhesive may be excellently maintained.

The pressure-sensitive adhesive composition may further include a silane coupling agent. As the silane coupling agent, for example, a silane coupling agent having a β-cyano group or an acetoacetyl group may be used. Such a silane coupling agent may serve to make the pressure-sensitive adhesive formed by a copolymer having a low molecular weight have excellent cohesiveness and adhesive stability, and maintain excellent durability and reliability in heat resistance and heat and humidity resistance conditions.

As the silane coupling agent having a β-cyano group or an acetoacetyl group, for example, a compound represented by Formula 1 or 2 may be used.

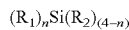  [Formula 1]

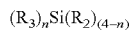  [Formula 2]

In Formula 1 or 2, $R_1$ is a β-cyanoacetyl group or a β-cyanoacetylalkyl group, $R_3$ is an acetoacetyl group or an acetoacetylalkyl group, $R_2$ is an alkoxy group, and n is a number of 1 to 3.

In Formula 1 or 2, the alkyl group may be an alkyl group having 1 to 20, 1 to 16, 1 to 12, 1 to 8 or 1 to 4 carbon atoms, and may be linear, branched or cyclic.

In addition, in Formula 1 or 2, the alkoxy group may be an alkoxy group having 1 to 20, 1 to 16, 1 to 12, 1 to 8 or 1 to 4 carbon atoms, and may be linear, branched or cyclic.

In addition, in Formula 1 or 2, n may be, for example, a number of 1 to 3 or 1 to 2, or 1.

As the compound of Formula 1 or 2, for example, acetoacetylpropyl trimethoxy silane, acetoacetylpropyl triethoxy silane, β-cyanoacetylpropyl trimethoxy silane or β-cyanoacetylpropyl triethoxy silane may be used, but the present invention is not limited thereto.

In the pressure-sensitive adhesive composition, the silane coupling agent may be included at 0.01 to 5 or 0.01 to 1 parts by weight, relative to 100 parts by weight of the block copolymer, and in this range, desired physical properties may be effectively provided to the pressure-sensitive adhesive.

The pressure-sensitive adhesive composition may further include a tackifier as needed. The tackifier may be, but is not limited to, a hydrocarbon-based resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin and a polymerized rosin ester resin, which may be used alone or in combination of at least two thereof. The tackifier resin may be included at 100 parts by weight or less, relative to 100 parts by weight of the block polymer.

In addition, the pressure-sensitive adhesive composition may further include at least one additive selected from the group consisting of an epoxy resin, a curing agent, a UV stabilizer, an antioxidant, a coloring agent, a reinforcing agent, a filler, a foaming agent, a surfactant and a plasticizer, when needed.

The pressure-sensitive adhesive composition may have a coating solid content of 20 wt % or more or 25 wt % or more. The term "coating solid content" used herein may refer to a solid content of the pressure-sensitive adhesive composition, that is, a coating solution, at the time of application in a coating process for forming a pressure-sensitive adhesive. Such a coating solid content may be measured by, for example, a method to be disclosed in the following Example. Conventionally, when applied in the coating process, the pressure-sensitive adhesive composition, that is, the coating solution includes the block copolymer, the crosslinking agent, the initiator and other additives, and may also include a solvent. By controlling the coating solid content to 20 wt % or more, productivity of the pressure-sensitive adhesive, optical film or display device may be maximized. The upper limit of the coating solid content may be suitably controlled in the range of, for example, 50 wt % or less, 40 wt % or less, or 30 wt % or less, in consideration of a viscosity for the coating process, without particular limitation.

The pressure-sensitive adhesive composition may also have a coating viscosity at 23° C. of 500 cP to 3,000 cP. The term "coating viscosity" may refer to a viscosity of the pressure-sensitive adhesive composition, that is, the coating solution, when applied in the coating process for forming a pressure-sensitive adhesive, and may also refer to a viscosity in a state in which the pressure-sensitive adhesive composition is maintained at the above-described coating solid content. The coating viscosity at 23° C. may be in the range from, for example, 500 cP to 2,500 cP, 700 cP to 2,500 cP, or 900 cP to 2,300 cP. The pressure-sensitive adhesive composition including the block copolymer may have a viscosity at a level at which effective coating is possible, even when a coating solid content is high.

The pressure-sensitive adhesive composition may have a gel fraction after a crosslinked structure is embodied of 80 wt % or less. The gel fraction may be calculated by the following Equation 1.

$$\text{Gel fraction}(\%) = B/A \times 100 \qquad [\text{Equation 1}]$$

In equation 1, A is a weight of the pressure-sensitive adhesive composition in which a crosslinked structure is embodied, and B is a dry weight of an insoluble content harvested after the pressure-sensitive adhesive composition having the weight A is precipitated in ethyl acetate for 72 hours at room temperature while put in a 200 mesh-sized net.

By maintaining the gel fraction to 80 wt % or less, workability, durability and reliability, and reworkability may be excellently maintained. The lower limit of the gel fraction of the pressure-sensitive adhesive composition may be, but is not particularly limited to, for example, 0 wt %. However, the sentence "gel fraction is 0 wt %" does not mean that a crosslinking reaction does not progress at all in the pressure-sensitive adhesive composition. For example, the pressure-sensitive adhesive composition having a gel fraction of 0 wt % may include a pressure-sensitive adhesive composition in which a crosslinking reaction does not progress at all or a pressure-sensitive adhesive composition in which a crosslinking reaction is performed to some extent but to a low level, thereby leaking a gel without maintaining the gel in the 200 mesh-sized net.

The pressure-sensitive adhesive composition may be a pressure-sensitive adhesive composition for an optical film. The pressure-sensitive adhesive composition for an optical film may be used to laminate optical films such as a polarizing film, a retardation film, an anti-glare film, a wide viewing angle compensation film or a brightness-enhancing film, or attach the optical film or a laminate thereof to an adherent such as a liquid crystal panel. In one embodiment, the pressure-sensitive adhesive composition may be used to attach a polarizing film to a liquid crystal panel as a pressure-sensitive adhesive composition for a polarizing plate.

Another aspect of the present invention provides a pressure-sensitive adhesive optical laminate. An exemplary optical laminate may include an optical film; and a pressure-sensitive adhesive layer formed on one or both surfaces of the optical film. The pressure-sensitive adhesive layer may be, for example, a pressure-sensitive adhesive layer used to attach the optical film to a different optical film such as a liquid crystal panel of an LCD device. In addition, the pressure-sensitive adhesive layer may include the pressure-sensitive adhesive composition described above. The pressure-sensitive adhesive composition may be included in the pressure-sensitive adhesive layer in a state in which a crosslinked structure is embodied. Here, as the optical film, a polarizing film, a retardation film, a brightness-enhancing film or a laminate structure in which at least two thereof are laminated may be used.

Still another aspect of the present invention provides a pressure-sensitive adhesive polarizing plate. The polarizing plate may have, for example, a structure in which the optical film in the pressure-sensitive adhesive optical laminate is a polarizing plate.

The kind of a polarizing film included in the polarizing plate is not particularly limited, and may employ a general kind known in the art, such as a polyvinylalcohol-based polarizing film, without limitation.

The polarizing film is a functional film capable of extracting only light oscillating in one direction from incident light oscillating in various directions. Such a polarizing film may be, for example, a type in which a dichroic dye is adsorbed and oriented to a polyvinylalcohol-based film. For example, the polyalcohol-based resin constituting the polarizing film may be obtained by gelating a polyvinylacetate-based resin. In this case, in the available polyvinylacetate-based resin, vinyl acetate and a copolymer of a monomer capable of being copolymerized with the vinyl acetate, as well as a homopolymer of the vinyl acetate, may also be included. The monomer capable of being copolymerized with the vinyl acetate may be, but is not limited to, one or a mixture of at least two of unsaturated carbonates, olefins, vinylethers, unsaturated sulfonates and acrylamides having an ammonium group. Generally, the degree of gelation of the polyvinylalcohol-based resin may be approximately 85 mol % to 100 mol %, and preferably 98 mol % or more. The polyvinylalcohol-based resin may be further modified, and for example, may be polyvinylformal or polyvinylacetal modified with an aldehyde. Generally, the degree of polymerization of the poylvinylalcohol-based resin may be traditionally 1,000 to 10,000, or 1,500 to 5,000.

The polarizing film may be manufactured by orienting the above-described polyvinylalcohol-based resin film (e.g., uniaxial orientation), dying the polyvinylalcohol-based resin film with a dichroic dye and adsorbing the dichroic dye, treating the polyvinylalcohol-based resin film to which a dichroic dye is adsorbed with a boric acid aqueous solution, and then washing the polyvinylalcohol resin film. Here, as the dichroic dye, iodine or a dichroic organic dye may be used.

The polarizing plate of the present invention may further include a protective film attached to one or both surfaces of the polarizing film, and in this case, the pressure-sensitive adhesive layer may be formed on one surface of the protective film. The kind of the protective film is not specifically limited, and thus may be a cellulose-based film such as formed of triacetyl cellulose (TAC); a polyester-based film such as a polycarbonate or poly(ethylene terephthalate) (PET) film; a polyethersulfone-based film; and a film having one or a laminate structure having at least two of a polyethylene film, a polypropylene film and a polyolefin-based film manufactured using a resin having a cyclo-based or norbornene structure or an ethylene-propylene copolymer.

The polarizing plate may further include at least one functional layer selected from the group consisting of a protective layer, a reflective layer, an anti-glare layer, a retardation plate, a wide viewing angle compensating film, and a brightness-enhancing film.

In the present application, a method of forming a pressure-sensitive adhesive layer on the polarizing plate or optical film is not particularly limited, and thus a method of directly coating and curing the pressure-sensitive adhesive composition on the polarizing plate or optical film, or a method of coating and curing the pressure-sensitive adhesive composition on a release-treated surface of a releasing film and transferring the resulting composition to the polarizing plate may be used.

Here, a method of coating the pressure-sensitive adhesive composition may be a method of coating the pressure-sensitive adhesive composition by a conventional means, such as a bar coater, without particular limitation.

In the coating process, the multifunctional crosslinking agent included in the pressure-sensitive adhesive composition may be controlled such that functional groups are not crosslinked in terms of uniform coating, thereby forming a crosslinked structure by the crosslinking agent in curing and aging processes after coating. As a result, the cohesive strength, pressure-sensitive adhesion property and cuttability of a pressure-sensitive adhesive may be enhanced.

The coating process may be performed after a bubble-generating component such as a volatile component or reaction residue in the pressure-sensitive adhesive composition is sufficiently removed, and thus the problems of reducing an elasticity due to excessively a low crosslink density or molecular weight of the pressure-sensitive adhesive, and forming a scatterer in the composition since bubbles present between a glass plate and a pressure-sensitive adhesive layer become larger, may be prevented.

After coating, a method of embodying a crosslinked structure by curing the pressure-sensitive adhesive composition is not particularly limited either, and may be, for example, a method of maintaining the coating layer at a suitable temperature to induce a crosslinking reaction between the block copolymer and the multifunctional crosslinking agent, which are included in the coating layer.

Yet another aspect of the present invention provides a display device, for example, an LCD device. The exemplary display device may include a liquid crystal panel and the polarizing plate or optical laminate attached to one or both surfaces of the liquid crystal panel. The polarizing plate or optical laminate may be attached to the liquid crystal panel by the above-described pressure-sensitive adhesive.

In the device, as the liquid crystal panel, for example, any one of known panels including a passive matrix panel such as a twisted nematic(TN) type, super twisted nematic(STN) type, ferroelectric(F) type or polymer dispersed(PD) type panel; an active matrix panel such as a two-terminal or three-terminal panel; an in-plane switching(IPS) panel; and a vertical alignment(VA) panel may be used.

In addition, other components of the LCD device, for example, the kinds of upper and lower substrates, such as a color filter or an array substrate, are not particularly limited either, and thus any configuration known in the art may be employed without limitation.

Advantageous Effects

The pressure-sensitive adhesive composition of the present application may form a pressure-sensitive adhesive having excellent durability and reliability, stress relaxation and reworkability. In addition, when the pressure-sensitive adhesive composition is used collaterally, for example, a coating process may be efficiently performed even when a coating solid content is high, thereby maintaining excellent productivity and forming a pressure-sensitive adhesive having excellent uniformity in thickness. The pressure-sensitive adhesive composition may be used for an optical film such as a polarizing plate.

MODE FOR INVENTION

Hereinafter, the pressure-sensitive adhesive composition will be described in detail with reference to Examples and Comparative Examples, but the scope of the pressure-sensitive adhesive composition is not limited to the following Examples.

1. Evaluation of Weight-average Molecular Weight

A weight-average molecular weight($M_n$) and polydispersity index(PDI) were measured using GPC according to the following conditions. To draw a calibration curve, standard polystyrene produced by Agilent System was used, and the measurement results were converted.

<Measurement Conditions>
Measurer: Agilent GPC (Agilent 1200 series, U.S.)
Column: connected two PL Mixed B
Column temperature: 40° C.
Eluent: tetrahydrofuran (THF)
Flow Rate: 1.0 ml/min
Concentration: ~1 mg/mL (100 µL injection)

2. Coating Solid Content

Coating solid contents were evaluated by the following method:

<Order of Measuring Coating Solid Content>
1) A weight(A) of an aluminum dish was measured.
2) A pressure-sensitive adhesive composition (sample that was not dried) from Example or Comparative Example was harvested in an amount of 0.3 g or 0.5 g and put into the aluminum dish.
3) A polymerization inhibitor (hydroquinone) solution dissolved in ethyl acetate (concentration:0.5 wt %) was added to an extremely small amount of the pressure-sensitive adhesive composition using a pipette.
4) The resulting product was dried in an oven at 150° C. for 30 minutes to remove the solvent.
5) The resulting product was cooled at room temperature for 15 to 30 minutes, and subjected to measurement of a weight of a residual component(weight of the sample after drying).
6) A coating solid content was evaluated by the following equation according to the measurement result.

$$\text{Coating solid content (unit:\%)} = 100 \times (DS-A)/(S+E) \quad \text{<Equation>}$$

DS: the weight(A) of the aluminum dish+the weight of the sample after drying (unit: g)
A: the weight of the aluminum dish(unit:g)
S: the weight of the sample before drying(unit:g)
E: the weight of the removed components(solvent,etc.) (unit:g)

3. Evaluation of Viscosity

A viscosity of the pressure-sensitive adhesive composition was evaluated by the following method using a Brookfield digital viscometer(DV-I+, DV-II+Pro).

<Order of Measuring Viscosity>
1) 180 ml of a pressure-sensitive adhesive composition (sample) was put into a beaker and left under constant temperature/constant humidity (23° C./50% relative humidity) for 1 hour to remove bubbles.
2) A spindle was obliquely put into the sample without bubbles such that a liquid surface of the pressure-sensitive adhesive composition (sample) was not at a lower level than a groove of the spindle.
3) The spindle was connected to the viscometer to fit the liquid surface of the sample in the groove of the spindle.
4) An RPM of the spindle was selected by pressing a set speed key.
5) The viscometer was operated by pressing a motor on/off key.

A value was obtained after a viscosity number shown on a screen stabilized. Fixation of RPM was performed when an RPM having a confidence interval of approximately 10% or more was selected on the display, and a viscosity was measured.

4. Evaluation of Coating Property

Coating property of the pressure-sensitive adhesive composition prepared in each of the Examples and Comparative Examples was evaluated according to the following criteria by coating the compositions and observing a coating layer with the naked eye.

<Evaluation Criteria>
A: No bubbles and lines on the coating layer were observed with the naked eye.
B: Bubbles and/or lines on the coating layer were vaguely observed with the naked eye.
C: Bubbles and/or lines on the coating layer were clearly observed with the naked eye.

5. Evaluation of Durability

A specimen was manufactured by cutting a polarizing plate formed in an Example or Comparative Example to have a width of approximately 180 mm and a length of approximately 320 mm, and attached to a 19-inch commercially available panel. Afterward, the panel was stored in an autoclave (50° C., 5 atm) for approximately 20 minutes, thereby preparing a sample. Humidity and heat resistance durability of the prepared sample was evaluated according to the following criteria by leaving the sample under conditions of a temperature of 60° C. and a relative humidity of 90% for 500 hours and observing the occurrence of bubbling and peeling at a pressure-sensitive adhesive interface. The heat resistance durability was evaluated according to the following criteria by maintaining the sample at 80° C. for 500 hours and observing the occurrence of bubbling and peeling.

<Evaluation Criteria>

A: No Bubbling and peeling occurred

B: Bubbling and/or peeling slightly occurred

C: Bubbling and/or peeling considerably occurred.

6. Calculation of Glass Transition Temperature

Glass transition temperatures(Tg) of respective blocks of a block copolymer were calculated according to the following equation.

$$1/Tg = \Sigma Wn/Tn \qquad \text{<Equation>}$$

In this equation, Wn was a weight fraction of a monomer used in each block, and Tn was a glass transition temperature obtained when the used monomer forms a homopolymer.

That is, in this equation, the right side represented a result obtained by summarizing values(Wn/Tn) obtained by dividing the weight fraction of the used monomer with the glass transition temperature obtained when the used monomer formed a homopolymer by monomers.

7. Measurement of Conversion Rate and Composition Ratio

The conversion rate in a polymerization process between methyl methacrylate(MMA), which was a main monomer for forming a first block, and butyl acrylate(BA), which was a main monomer for forming a second block, in a block copolymer of Example or Comparative Example, and the composition ratio in the block copolymer, were calculated by the following Equation according to 1H-NMR results.

<Conversion Rate of MMA>

$$\text{MMA conversion rate}(\%) = 100 \times B/(A+B)$$

Here, A is an area of a peak (in the vicinity of 3.4 ppm to 3.7 ppm) derived from a methyl group derived from MMA included in a polymer, and B is an area of a peak (in the vicinity of 3.7 ppm) derived from a methyl group of unpolymerized MMA. That is, the conversion rate of the monomer was calculated in consideration of a shift position of the metal peak in the structure of the MMA.

<Conversion Rate of BA>

$$\text{BA conversion rate}(\%) = 100 \times C/(C+D)$$

Here, D is an area of a peak (in the vicinity of 5.7 ppm to 6.4 ppm) derived from $=CH_2$ at a terminal end of a double bond, and C is an area of a peak (in the vicinity of 3.8 ppm to 4.2 ppm) derived from $-OCH_2-$ present in a polymer formed by polymerization of BA. That is, a relative values of the $=CH_2$ peak and the $-OCH_2-$ peak of the polymer were calculated, thereby measuring the conversion rate of BA.

<Calculation of Composition Ratio>

A ratio of the first and second blocks of the block copolymer was estimated by the following formula, based on a ratio of MMA to BA, which were the main monomers used to form the first and second blocks.

$$\text{Content of MMA in block copolymer}(\%) = 100 \times \text{MMA peak area/BA peak area} \qquad \text{<Equation>}$$

Here, the MMA peak area is an area value per 1H proton of the peak (peak observed by $-CH_3$ derived from MMA) in the vicinity of 3.4 to 3.7 ppm in 1H-NMR, and a BA peak area is an area value per 1H proton of the peak (peak observed by $-OCH_2-$ present in the polymer formed by BA) in the vicinity of 3.8 to 4.2 ppm in 1H-NMR.

That is, a weight ratio of the first and second blocks was estimated by calculating a relative value of the $-CH_3$ peak in the MMA structure and the $-OCH_2$-present in the polymer formed by BA.

PREPARATION EXAMPLE 1

Preparation of Block Copolymer (A)

0.1 g of ethyl 2-bromoisobutyrate(EBiB) and 14.2 g of methyl methacrylate(MMA) were mixed with 6.2 g of ethyl acetate(EAc). A flask containing the resulting mixture was sealed with a rubber layer, purged with nitrogen and stirred at about 25° C. for about 30 minutes, and subjected to removal of dissolved oxygen through bubbling. Afterward, 0.002 g of $CuBr_2$, 0.005 g of tris(2-pyridylmethyl)amine (TPMA) and 0.017 g of (2,2'-azobis(2,4-dimethyl valeronitrile) (V-65) were put into the oxygen-removed mixture, and immersed in a reaction vessel at approximately 67° C. to initiate a reaction (polymerization of the first block). At the time when the conversion rate of MMA was approximately 75%, a mixture of 155 g of butyl acrylate (BA), 0.8 g of hydroxybutyl acrylate (HBA) and 250 g of ethyl acetate (EAc) which was previously bubbled with nitrogen was input in the presence of nitrogen. Afterward, 0.006 g of $CuBr_2$, 0.012 g of TPMA and 0.05 g of V-65 were put into a reaction flask and a chain extension reaction was performed (polymerization of the second block). When the conversion rate of the monomer(BA) approached 80% or more, the reaction mixture was exposed to oxygen and diluted with a suitable solvent to terminate the reaction, thereby preparing a block copolymer (In this process, V-65 was suitably divided and input until a reaction termination time, in consideration of its half-life).

PREPARATION EXAMPLES 2 to 7

Preparation of block copolymers (A2 to A4 and B1 to B3)

A block copolymer was prepared by the same method as described in Preparation Example 1, except that kinds of ingredients and additives used in the polymerization of the first block were controlled as shown in Table 1, and kinds of ingredients and additives used in the polymerization of the second block were controlled as shown in Table 2.

TABLE 1

| | | Ingredient | | | | | | | |
|---|---|---|---|---|---|---|---|---|---|
| | | MMA | BMA | HPMA | EBiB | EA | $CuBr_2$ | TPMA | V-65 |
| Block copolymer | A1 | 14.2 | — | — | 0.1 | 6.2 | 0.002 | 0.005 | 0.017 |
| | A2 | 11.2 | 2.8 | — | 0.08 | 6.1 | 0.002 | 0.005 | 0.016 |
| | A3 | 9.4 | 6.3 | — | 0.07 | 6.8 | 0.002 | 0.005 | 0.016 |
| | A4 | 35.8 | 15.3 | — | 0.1 | 22 | 0.008 | 0.016 | 0.055 |
| | B1 | 11.6 | 2.4 | 0.4 | 0.08 | 6.2 | 0.002 | 0.005 | 0.016 |
| | B2 | 11.6 | 2.4 | 0.4 | 0.08 | 6.2 | 0.002 | 0.005 | 0.016 |
| | B3 | 5.8 | — | — | 0.1 | 2.5 | 0.001 | 0.002 | 0.007 |

Content unit: g
MMA: methyl methacrylate (homopolymer Tg: about 110° C.)
BMA: butyl methacrylate(homopolymer Tg: about 27° C.)
HPMA: 2-hydroxypropyl methacrylate (homopolymer Tg: about 26° C.)
EBiB: ethyl 2-bromoisobutyrate
EA: Ethyl acetate
TPMA: tris(2-pyridylmethyl)amine
V-65: 2,2'-azobis(2,4-dimethyl valeronitrile)

TABLE 2

| | | Ingredient | | | | | |
|---|---|---|---|---|---|---|---|
| | | BA | HBA | EA | $CuBr_2$ | TPMA | V-65 |
| Block copolymer | A1 | 115 | 0.8 | 250 | 0.006 | 0.01 | 0.05 |
| | A2 | 151 | 4.7 | 250 | 0.006 | 0.01 | 0.05 |
| | A3 | 146 | 9.3 | 250 | 0.006 | 0.01 | 0.05 |
| | A4 | 113 | 5.9 | 234 | 0.0002 | 0.0004 | 0.047 |
| | B1 | 156 | — | 250 | 0.006 | 0.01 | 0.05 |
| | B2 | 151 | 4.7 | 250 | 0.006 | 0.01 | 0.05 |
| | B3 | 163 | 0.8 | 250 | 0.006 | 0.01 | 0.05 |

Content unit: g
BA: butyl acrylate (homopolymer Tg: about −45° C.)
HBA: 4-hydroxybutyl acrylate (homopolymer Tg: about −80° C.)
EA: Ethyl acetate
TPMA: tris(2-pyridylmethyl)amine
V-65: 2,2'-azobis(2,4-dimethyl valeronitrile)

Characteristics of the block copolymers prepared by the above-described methods are shown in Table 3.

TABLE 3

| | | Block copolymer | | | | | | |
|---|---|---|---|---|---|---|---|---|
| | | A1 | A2 | A3 | A4 | B1 | B2 | B3 |
| First block | MMA ratio | 100 | 80 | 60 | 70 | 81 | 81 | 100 |
| | BMA ratio | 0 | 20 | 40 | 30 | 16 | 16 | 0 |
| | HPMA ratio | 0 | 0 | 0 | 0 | 3 | 3 | 0 |
| | Tg(° C.) | 110 | 90 | 72 | 80 | 90 | 90 | 110 |
| | Mn(×10000) | 1.9 | 2.3 | 2.9 | 3.8 | 2.3 | 2.3 | 0.8 |
| | PDI | 1.27 | 1.34 | 1.38 | 1.41 | 1.36 | 1.36 | 1.18 |
| Second block | BA ratio | 99.5 | 97.0 | 94.0 | 95.0 | 100.0 | 97.0 | 99.5 |
| | HBA ratio | 0.5 | 3.0 | 6.0 | 5.0 | 0.0 | 3.0 | 0.5 |
| | Tg(° C.) | −47 | −46.2 | −47.5 | −47.0 | −45 | −46.2 | −47.0 |
| Block copolymer | Mn(×10000) | 10.6 | 12.3 | 14.1 | 10.4 | 12.4 | 12.2 | 10.1 |
| | PDI | 1.7 | 1.8 | 2.1 | 2.1 | 1.8 | 1.8 | 1.6 |
| | First block: Second block (weight ratio) | 10.5:89.5 | 10.1:89.9 | 11.2:88.8 | 34.7:65.3 | 10.1:89.9 | 10.1:89.9 | 4.2:95.8 | monomer ratio unit: parts by weight
BA: butyl acrylate (homopolymer Tg: about −45° C.)
HBA: 4-hydroxybutyl acrylate (homopolymer Tg: about −80° C.)
MMA: methyl methacrylate (homopolymer Tg: about 110° C.)
BMA: butyl methacrylate(homopolymer Tg: about. 27° C.)
HPMA: 2-hydroxypropyl methacrylate (homopolymer Tg: about. 26° C.)
Tg: glass transition temperature
Mn: number average molecular weight (Mn)
PDI: polydispersity index

PREPARATION EXAMPLE 8

Preparation of Random Copolymer (B4)

10 parts by weight of MMA, 87.3 parts by weight of n-butyl acrylate and 2.7 parts by weight of 4-hydroxybutyl acrylate were put into a 1 L reactor equipped with a cooling system refluxed with a nitrogen gas and facilitating temperature control, 200 ppm of n-dodecyl mercaptan was added as a molecular weight was controlled, and 120 parts by weight of ethyl acetate was input. Subsequently, to control oxygen, purging with a nitrogen gas was performed for 60 minutes, 0.05 parts by weight of azobisisobutyronitrile(AIBN) was input as a reaction initiator while the temperature was maintained at 60° C. and reacted for approximately 8 hours, thereby preparing a random copolymer. A number average molecular weight($M_n$) of the prepared random copolymer(B4) was about 132,000, and a polydispersity index (PDI) thereof was about 4.6.

EXAMPLE 1

Preparation of Coating Solution(Pressure-sensitive Adhesive Composition)

0.04 parts by weight of a crosslinking agent (Coronate L, NPU, Japan), 0.1 parts by weight of dibutyltin dilaurate (DBTDL) and 0.2 parts by weight of a silane coupling agent having a β-cyanoacetyl group were mixed, relative to 100 parts by weight of the block copolymer(A1) prepared in Preparation Example 1, and ethyl acetate was blended as a solvent to control a coating solid content to be approximately 33 wt %, thereby preparing a coating solution (pressure-sensitive adhesive composition).

Preparation of Pressure-sensitive Adhesive Polarizing Plate

The prepared coating solution was coated on a release-treated surface of a releasing poly(ethylene terephthalate) (PET) (MRF-38, Mitsubishi) having a thickness of 38 μm to have a dry thickness of approximately 23 μm, and maintained in an oven at 110° C. for about 3 minutes. The coating layer formed on the releasing PET layer was laminated on a WV liquid crystal layer of a polarizing plate (a laminate structure of TAC/PVA/TAC: TAC=triacetylcellulose, PVA=polyvinylalcohol-based a polarizing film), one surface of which was coated with the wide view(WV) liquid crystal layer, thereby preparing a pressure-sensitive adhesive polarizing plate.

EXAMPLES 2 AND 3 AND COMPARATIVE EXAMPLES 1 TO 4

A pressure-sensitive adhesive composition(coating solution) and a pressure-sensitive adhesive polarizing plate were manufactured by the same methods as described in Example 1, except that components and ratios thereof were controlled as shown in Table 4 in preparation of the pressure-sensitive adhesive composition(coating solution).

Evaluation results of physical properties of Examples or Comparative Examples are shown in Table 5.

TABLE 5

|  | Example | | | | Comparative Example | | | |
| --- | --- | --- | --- | --- | --- | --- | --- | --- |
|  | 1 | 2 | 3 | 4 | 1 | 2 | 3 | 4 |
| Coatability | A | A | A | A | A | A | A | A |
| Heat resistance durability | A | A | A | A | C | C | B | C |
| Humidity and heat resistance durability | A | A | A | A | B | C | B | C |

The invention claimed is:
1. A pressure-sensitive adhesive composition, comprising:
a block copolymer having 5 to 50 parts by weight of a first block having a glass transition temperature of 50° C. or more; and 50 to 95 parts by weight of a second block having a glass transition temperature of −10° C. or less, and comprising a crosslinkable functional group; and
a silane coupling agent selected from the group consisting of compounds represented by Formula 1,
wherein the crosslinkable functional group is not comprised in the first block but in the second block,
wherein the first block comprises a polymerized unit derived from a methacrylic acid ester monomer,
wherein the block copolymer has a polydispersity index of 1.9 to 2.5,
wherein the block copolymer has a number average molecular weight of 90,000 to 300,000,
wherein the pressure-sensitive adhesive composition has a coating solid content of 20 to 50 wt %, and
wherein a coating viscosity is 500 cP to 3,000 cP at 25° C.:

$$(R_1)_n Si(R_2)_{(4-n)}$$ [Formula 1]

in Formula 1, $R_1$ is a β-cyanoacetyl group or a β-cyanoacetylalkyl group, $R_2$ is an alkoxy group, and n is a number of 1 to 3.

2. The pressure-sensitive adhesive composition of claim 1, where the crosslinkable functional group is a hydroxyl group.

TABLE 4

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Acryl polymer | Kind | A1 | A2 | A3 | A4 | B4 | B1 | B2 | B3 |
|  | Content | 100 | 100 | 100 | 100 | 100 | 100 | 100 | 100 |
| Content of crosslinking agent | | 0.04 | 0.07 | 0.2 | 0.2 | 0.07 | 0.07 | 0.07 | 0.07 |
| Content of DBTDL | | 0.1 | 0.1 | 0.1 | 0.1 | 0.1 | 0.1 | 0.1 | 0.1 |
| Content of SCA | | 0.2 | 0.2 | 0.2 | 0.2 | 0.2 | 0.2 | 0.2 | 0.2 |
| Content of coating solid | | 33 | 30 | 28 | 23 | 25 | 30 | 30 | 35 |
| Viscosity of coating solution (23° C.) | | 1860 | 1760 | 1700 | 1690 | 1900 | 1650 | 1920 | 1770 |

Content unit: parts by weight
Crosslinking agent: coronate L, NPU, Japan)
DBTDL: dibutyltin dilaurate
SCA: silane coupling agent having β-cyanoacetyl group (M812, LG Chem., Ltd.)
Unit of coating solid content: wt %
Unit of viscosity of coating solution: cP 3. The pressure-sensitive adhesive composition of claim 1, wherein the second block comprises a polymerized unit derived from 90 to 99.9 parts by weight of an acrylic acid ester monomer and 0.1 to 10 parts by weight of a copolymerizable monomer having a crosslinkable functional group.

4. The pressure-sensitive adhesive composition of claim 1, wherein the first block has a number average molecular weight of 2,500 to 150,000.

5. The pressure-sensitive adhesive composition of claim 1, wherein the block copolymer is a diblock copolymer having the first and second blocks.

6. The pressure-sensitive adhesive composition of claim 1, further comprising:
   a crosslinking agent having at least two functional groups capable of reacting with the crosslinkable functional group.

7. The pressure-sensitive adhesive composition of claim 6, wherein the crosslinking agent is comprised at 0.01 to 10 parts by weight, relative to 100 parts by weight of the block copolymer.

8. The pressure-sensitive adhesive composition of claim 1, wherein a gel fraction after a crosslinked structure is embodied is 80 wt % or less.

9. A pressure-sensitive adhesive optical laminate, comprising:
   an optical film; and
   a pressure-sensitive adhesive layer present on one or both surfaces of the optical film and formed from the pressure-sensitive adhesive composition of claim 1.

10. A pressure-sensitive adhesive polarizing plate, comprising:
    a polarizing film; and
    a pressure-sensitive adhesive layer present on one or both surfaces of the polarizing film and formed from the pressure-sensitive adhesive composition of claim 1.

11. The pressure-sensitive adhesive polarizing plate of claim 10, wherein the pressure-sensitive adhesive composition is comprised into the pressure-sensitive adhesive layer in state of formed a crosslinked structure.

12. A display device, comprising:
    the pressure-sensitive adhesive optical laminate of claim 9 attached to one or both surfaces of a liquid crystal panel or the pressure-sensitive adhesive polarizing plate of claim 10.

* * * * *